United States Patent [19]

White

[11] Patent Number: 5,629,405
[45] Date of Patent: May 13, 1997

[54] METHOD FOR MAKING POLYARYLENE ETHERS WITH PYRIDINE CATALYSTS

[75] Inventor: Dwain M. White, Schenectady, N.Y.

[73] Assignee: General Electric Company, Schenectady, N.Y.

[21] Appl. No.: 560,603

[22] Filed: Nov. 20, 1995

[51] Int. Cl.$^6$ .................................................. C08G 65/38
[52] U.S. Cl. ........................ 528/215; 528/125; 528/212; 528/216; 528/217; 528/218
[58] Field of Search ................................... 528/125, 216, 528/217, 215, 212, 218

[56] References Cited

U.S. PATENT DOCUMENTS

| | | | |
|---|---|---|---|
| 3,306,874 | 2/1967 | Hay | 528/208 |
| 3,306,875 | 2/1967 | Hay | 528/208 |

OTHER PUBLICATIONS

Finkbeiner et al., Journal of Organic Chemistry, vol. 31 (Feb. 1966), "Polymerization by Oxidative Coupling. The Function of Copper in the Oxidation of 2,6–Dimethylphenol", pp. 549–551.

*Primary Examiner*—James J. Seidleck
*Assistant Examiner*—P. Hampton-Hightower
*Attorney, Agent, or Firm*—William H. Pittman

[57] ABSTRACT

A method for making polyarylene ethers is described and the method comprises the step of polymerizing hydroxyaromatic monomers or oligomers prepared therefrom in the presence of pyridine catalysts.

20 Claims, No Drawings

METHOD FOR MAKING POLYARYLENE ETHERS WITH PYRIDINE CATALYSTS

FIELD OF THE INVENTION

This invention relates to a novel method for making polyarylene ethers. More particularly, the instant invention is directed to a method for making branched polyphenylene ethers by melt or solvent polymerizing phenols or oligomers prepared therefrom in the presence of a catalyst comprising pyridine.

BACKGROUND OF THE INVENTION

Polyphenylene ethers (PPE) as well as blends prepared therefrom constitute an invaluable class of engineering thermoplastic resins. Resins of polyphenylene ethers are characterized by a unique combination of chemical, physical and electrical properties. For instance, they have favorable heat deflection temperatures and generally display high impact strengths. As a result of this unique combination of properties, resins of polyphenylene ethers are suitable for a broad range of commercial applications.

Typically, polyphenylene ethers are prepared via the oxidative coupling of phenols at low temperatures (about 35° C.) in the presence of a catalyst, and the oxidative coupling is carried out in an organic solvent such as toluene. Subsequent to polymerizing, solid polymer is isolated by precipitation with non-solvents like methanol. However, the typical oxidative coupling method is not always desirable, since among other reasons, it results in linear polymer which does not have favorable flow capabilities and because it requires environmentally unfriendly solvents.

It is of increasing interest to prepare polyarylene ethers like polyphenylene ethers by a method which does not, for instance, require the use of hazardous solvents and which results in branched polymers having better flow properties than linear polymers at about the same intrinsic viscosity.

The instant invention, therefore, is directed to a novel method for making branched polyarylene ethers without requiring the use of such solvents.

DESCRIPTION OF THE PRIOR ART

Efforts have been disclosed for preparing polyphenylene ethers. In U.S. Pat. No. 3,306,875, the disclosure of which is incorporated herein by reference, poly-(2,6-dimethyl-1,4-phenylene)-ether was prepared by reacting 2,6-dimethylphenol and CuCl in an organic solvent.

Still other investigators have made efforts for preparing polyphenylene ethers. In U.S. Pat. No. 4,028,341, the disclosure of which is incorporated herein by reference, polyphenylene ethers are prepared by reacting phenolic monomers, oxygen gas and copper catalysts in organic solvents.

SUMMARY OF THE INVENTION

The instant invention is directed to a novel method for making branched polyarylene ethers, said method comprises the step of melt or solvent polymerizing at least one member selected from the group consisting of hydroxyaromatic monomers and oligomers prepared therefrom, in the presence of:

(a) a catalyst composition comprising at least one member selected from the group consisting of pyridine and substituted pyridine; and (b) oxygen, wherein the method is conducted at temperature of greater than about 100° C. to about 220° C.

DETAILED DESCRIPTION OF THE PREFERRED EMBODIMENTS

In the instant invention, the preferred hydroxyaromatic monomers are phenolic monomers represented by the formula

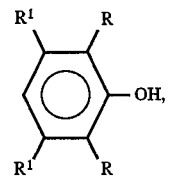

wherein each R is independently a halogen, $C_{1-10}$ alkyl group, aryl group, haloalkyl, aminoalkyl, hydrocarbonoxy, or halohydrocarbonoxy having at least 2 carbon atoms separating the halogen and oxygen atoms.

Each $R^1$ is independently a hydrogen, halogen, $C_{1-10}$ alkyl group, aryl group, haloalkyl, hydrocarbonoxy or halohydrocarbonoxy as defined for R. It is often preferred, however, that the phenolic monomers represented by formula I are 2,6-dimethylphenol or 2,3,6-trimethylphenol.

The preferred oligomers employed in this invention have at least one hydroxy end group and include those which are prepared from the polymerization of the phenolic monomers described above. There is no limitation with respect to the molecular weight of the oligomers; however, they often have a weight average molecular weight of less than about 5,000 and preferably less than about 3,000 as determined by gel permeation chromatography. Often they comprise 2,6-dimethylphenylene ether units.

There is essentially no limitation with respect to the catalyst composition comprising pyridine or substituted pyridine which may be employed in this invention other than that it is capable of enhancing the oxidative polymerization of the hydroxyaromatic monomers and/or oligomers.

Often, the preferred catalysts employed in this invention comprise a metal complex, pyridine and/or substituted pyridine. Moreover, such catalysts may consist essentially of the metal complex, pyridine and/or substituted pyridine and they may consist of the metal complex, pyridine and/or substituted pyridine.

The metal complex of the catalyst above is limited only to the extent that it enables the catalyst to function. It is, however, preferably a metal salt like a metal halide with copper chloride and bromide being most preferred.

There is no limitation with respect to the substituted pyridine which may be employed in the invention. Often, the substituents are $C_{1-10}$ alkyl groups, $C_{1-10}$ alkoxy groups, aryl groups or halogens. The most preferred substituted pyridines are those with substituents in the meta and/or para positions, with the proviso that the halogens are not in the para position.

The metal complex, pyridine and/or substituted pyridine of the catalyst composition are coordinated with one another, wherein coordinated with one another is defined to mean having metal-nitrogen bonds.

When preparing branched polyarylene ethers like branched polyphenylene ethers via the method described in this invention, catalyst stability/activity can decrease as the temperatures are increased during the course of the reaction. The increase in temperature is often necessary to offset the increase in viscosity that occurs as molecular weight builds. In view of this, it has been unexpectedly discovered that the catalyst comprising unsubstituted or substituted pyridine as described in this invention may be employed to produce polyarylene ethers at elevated temperatures.

The instant novel method reveals many new and unexpected results which include the discovery that organic solvents/anti-solvents are not required to produce branched polyphenylene ethers since said branched polyphenylene ethers may be prepared via melt polymerization. Additionally, it has been unexpectedly discovered that the products obtained via this method are branched polymers, which characteristically have better flow properties when compared to their linear polymer counterparts As previously stated, the novel method comprises the step of melt or solvent polymerizing hydroxyaromatic monomers and/or oligomer prepared therefrom in the presence of a catalyst and oxygen. There is no limitation with respect to the order in which the reactants and catalyst are added. Often, however, the catalyst and phenolic monomers are mixed, followed by oxygen addition and heat to produce the melt. The melt may be stirred (mixed or agitated, etc.) to homogeneity and additional catalysts known in the art may be added if desired thereafter.

When polymerizing via solvent polymerization, a substantially inert solvent may be employed and it may be added, for instance, to a premix of catalyst and monomer and/or oligomer, followed by oxygen addition. The resulting polymer may be recovered, for example, by ordinary techniques which include precipitation (which is usually induced by, for instance, the addition of aliphatic alcohols, ketones, ethers or the like) and filtering steps. An illustrative list of the inert solvents which may be employed includes toluene, benzene, chlorobenzene, dichlorobenzene, tetrahydrofuran or mixtures thereof.

The temperature at which the instant invention may be carried out is essentially only limited to what is required to: (1) keep the monomers (and subsequently the resulting reaction mixture of monomers, oligomers and polymers) molten (if melt polymerization is employed); and (2) assure that the catalysts are not destroyed. The temperature at which the reaction is conducted is often greater than 100° C. to about 220° C. and preferably from about 135° C. to about 200° C. and most preferably from about 150° C. to about 185° C., including all ranges subsumed therein.

There is essentially no limitation with respect to the pressure (oxygen pressure) at which the instant invention may be carried out, other than that the pressure is limited only to the extent that polymerization can occur and is often from about atmospheric pressure to about 5,000 psig. Often, atmospheric pressure is employed.

The amount of catalyst composition employed in this invention is not limited and varies with respect to the metal complex and the pyridine portion. The metal complex is often about 0.02 mole percent to about 5.0 mole percent and preferably about 0.05 mole percent to about 3.0 mole percent and most preferably from about 0.1 mole percent to about 1.0 mole percent based on total moles of hydroxyaromatic monomers (or monomer units if oligomer is employed), including all ranges subsumed therein.

The pyridine portion of the catalyst composition is often about 1.0 mole percent to about 50.0 mole percent and preferably about 2.0 mole percent to about 30.0 mole percent and most preferably from about 5.0 to 25.0 mole percent based on total moles of the hydroxyaromatic monomers (or monomer units if oligomer is employed), including all ranges subsumed therein. The often preferred catalysts employed are structural isomers of $CuCl_2 \cdot (CH_3O)_2 \cdot (pyridine)_2$ which may be prepared from $CuCl_2$, methanol and pyridine precursors.

The catalyst composition comprising at least one member selected from the group consisting of pyridine and substituted pyridine may be prepared, for example, by bubbling oxygen through a solution having pyridine, organic solvent and the metal complex.

There is no limitation with respect to the apparatus which may be employed. In fact any apparatus with a gas inlet, heating and cooling capability and stirring capability may be employed. Often, cylindrical round bottom glass reactors and pressure reactors are used.

Oxygen is introduced into the melt or solution, and a reaction mixture is produced which is preferably stirred to maximize polymerization. The viscosity of the reaction mixture gradually increases indicating polymer formation; however, the viscosity does not increase to the point of preventing stirring until the polymerization is complete. Subsequent to polymerization of substantially all monomer and/or oligomer, the reaction mixture is cooled to produce a reaction product and polymer is obtained therefrom. Further, it is within the scope of the instant invention to include phase transfer catalysts and dilute the reaction product with solvents in order to recover polymers according to their respective molecular weights. Moreover, the molecular weights of the product obtained may vary in accordance with the equipment employed since greater mixing capabilities result in the formation of higher molecular weight polymer.

It is further noted herein, that it is within the scope of the instant invention to employ conventional oxidative coupling catalysts in conjunction with the catalysts described in this invention. Such conventional oxidative coupling catalysts can include CuBr/dibutylamine (DBA), CuBr/N,N'-di-tert-butyl-1,2-ethylenediamine (DBEDA), tributylamine (TBA), tripentylamine (TPA), N,N-dimethylbutylamine (DMBA), N,N-dimethyloctylamine (DMOA), N,N,N',N'-tetramethylethylene diamine (TMEDA) and mixtures prepared therefrom, wherein at least about 50% by weight based on total weight of catalyst is catalyst composition comprising at least one member selected from the group consisting of pyridine and substituted pyridine.

The reaction product obtained via the novel method described in this invention unexpectedly has a favorable intrinsic viscosity which is defined to mean greater than about 0.05 dL/g and preferably greater than about 0.08 dL/g and most preferably greater than about 0.10 dL/g at ambient temperature.

The polymers obtained via the instant novel method include both homopolymer and copolymer branched polyphenylene ethers since it is within the scope of this invention to employ any viable mixture of phenolic monomers or oligomers as described above. Typical homopolymers obtained are those which contain, for example, 2,6-dimethyl-1,4-phenylene ether units. Typical copolymers obtained include, for example, random copolymers containing such units in combination with 2,3,6-trimethyl-1,4-phenylene ether units. Often, the branched polymers obtained are characterized by their 3,5-dimethyl-4-hydroxyphenyl head end groups and their 2,6-dimethylphenoxy tail end groups. Moreover, it is noted herein that branched polyphenylene ethers produced via the instant invention can be blended with, for instance, high impact polystyrenes, polyamides and/or polyesters. Such blending is disclosed, for example, in U.S. Pat. Nos. 4,866,130, 4,826,933 and 5,091,472, the disclosures of which are incorporated herein by reference.

It is further noted herein that the branched polyphenylene ethers obtained may be functionalized via any conventional method known to those skilled in the art. Such methods include those which employ chlorotriazines and polymerizable olefinic compounds and they are described, for example, in U.S. Pat. Nos. 5,115,043 and 4,994,525, the disclosures of which are incorporated herein by reference.

The following examples further illustrate and facilitate the understanding of the above-described novel process. The products obtained may be confirmed by conventional techniques such as proton and carbon-13 nuclear magnetic resonance spectroscopy, infrared spectroscopy and GPC analysis. The data indicates that branched polymer may be obtained having a molecular weight greater than the starting material, with or without solvent employment.

EXAMPLE 1

A cylindrical round bottom reaction vessel equipped with a stirrer, oxygen inlet tube with a fritted glass end and a thermometer was charged with 60 grams of biphenyl solvent, 6.0 grams of polyphenylene ether (2,6-dimethyl-1,4-phenylene ether units, intrinsic viscosity 0.07 dL/g and Mw about 2500) and 0.79 grams of pyridine (10 mmol). The resulting mixture was stirred vigorously and oxygen was passed through at 0.1 standard cubic feet per hour and 49 milligrams of CuCl (0.5 mmol) were added. The resulting reaction mixture was maintained at about 150° to about 160° C. by using a heating mantle and became viscous in about 30 minutes. The reaction was run for about 35 minutes and the reaction mixture was periodically sampled by removing approximately 0.2 mL portion which was subsequently diluted with about 2–3 mL of deuterochloroform and quenched with several drops of a 30% aqueous solution of trisodium nitrilotriacetate. Proton nuclear magnetic resonance analysis of the samples indicated that all of the phenolic end groups had been oxidized.

The reaction mixture was stirred with chloroform, filtered, and methanol was added to induce precipitation. The polyphenylene ether that precipitated (70% yield) had an intrinsic viscosity of 0.81 dL/g (in chloroform at 25° C.). Proton nuclear magnetic resonance analysis showed tail (2,6-dimethylphenoxy) end groups to be present and head (phenolic) end groups to be present. The high concentration of tail groups is indicative of branching. The molecular weight Mw, as determined by GPC analysis (based on polystyrene standards) was 31,000.

EXAMPLE 2

Example 2 was prepared in a manner similar to the one described in Example 1 except that 64 mg of TMEDA (0.55 mmol), 927 mg of TBA (5 mmol) and 49.5 mg of CuCl (0.5 mmol) were added and pyridine was omitted. After about 90 minutes, polyphenylene ether (90% yield) was obtained; however, GPC analysis revealed a branched product with a Mw of about 6,000.

EXAMPLE 3

Example 3 was conducted in a manner similar to the one described in Example 1 except that the catalyst employed was $Cu_2Cl_2(OCH_3)_2.(pyridine)2$ (1:40:200 mole ratio of Cu:pyridine:monomeric repeat units), prepared by oxygenating a mixture of 2 g CuCl in 8 mL pyridine and 100 mL methanol at 22° C. for 16 hours followed by filtering off and drying the resulting green precipitate. The reaction was conducted at about 150° to 160° C. and within 15 minutes, high molecular weight branched polyphenylene ether was obtained with partial gelling at about 20 minutes; yield about 95%, Mw of the portion soluble in chloroform was about 40,000).

EXAMPLE 4

Example 4 was conducted in a manner similar to the one described in Example 3 except that 4-phenylpyridine was used in lieu of pyridine, 1:50:500 weight ratio of Cu:4-phenylpyridine:monomeric repeat units. After about 20 minutes at a temperature of about 150° to 160° C., branched polyphenylene ether was obtained (yield about 95%, Mw 40,000) with gelation at about 22 minutes (yield about 95%).

EXAMPLE 5

Example 5 was prepared in a manner similar to the one described in Example 3 except that 4,4'-dipyridine was used in lieu of pyridine, 1:10:100 weight ratio of Cu:4,4'-dipyridine:monomeric repeat units. After about 50 minutes, the resulting branched polyphenylene ether (95% yield) had a Mw of 5,000.

EXAMPLE 6

Example 6 was prepared in a manner similar to the one described in Example 1 except that 60 g of phenylether were employed in lieu of biphenyl and 56 milligrams of copper phthalocyanine (0.1 mmol) and 0.37 g of tributylamine (2 mmol) were used in lieu of pyridine and copper chloride. After about 3 hours the resulting branched polyphenylene ether had a Mw of about 5,700. This example indicates that the catalyst composition employed in this invention is required for faster reaction rates.

EXAMPLE 7

Example 7 was prepared in a manner similar to the one described in Example 3 except that the ratio of catalyst (Cu:pyridine:monomeric repeat units) was 1:100:500 and the temperature of the reaction was about 195° C. Branched polyphenylene ether was recovered by adding 500 mL of methanol containing 10 mL of acetic acid. The Mw of the resulting branched polyphenylene ether after 15 minutes was about 40,000.

EXAMPLE 8

A cylindrical round bottom reaction vessel eqipped with a stirrer, oxygen inlet tube with a fritted glass end and a thermometer was charged with 6.0 g of polyphenylene ether oligomers (Mw 2,500; intrinsic viscosity 0.07 dL/g) and a catalyst solution which was added dropwise prepared from 52.4 mg $(Cu_2Cl_2(OCH_3)_2.(pyridine)_2$ (0.25 meq Cu) in 0.79 g pyridine (10 mmol). The contents were stirred to produce a mixture which was heated to about 155° C. via an oil bath. The mixture was stirred and under an oxygen atmosphere the temperature of the mixture was raised to 160° C. over a 5 minute period. The temperature was maintained at 160° C. for 10 minutes and a melt mixture resulted. Polyphenylene ether was obtained as indicated by the increase in viscosity of the melt mixture. The molecular weight of the resulting polyphenylene ether, as per GPC analysis, was about 5,000. The intrinsic viscosity of the resulting polymer was about 0.12 dL/g which was consistent with the GPC analysis.

EXAMPLE 9

A cylindrical round bottom flask was charged with 61 g of molten 2,6-xylenol (500 mmol) and 7.9 g pyridine (100 mmol). The resulting mixture was maintained at about 35° C. and 0.524 g $Cu_2Cl_2(OCH_3)_2.(pyridine)_2$ (2.5 mmol) were added followed by oxygen introduction at 0.3 standard cubic feet per hour. The temperature of the resulting mixture was maintained between 35° and 40° C. for 80 minutes and gradually raised to 100° C. after 180 minutes and 165° C. after 265 minutes.

The mixture was sampled periodically by removing a 0.3 g portion and dissolving it in 2 mL deuterochloroform and quenched with several drops of a 30% aqueous solution of trisodium nitriloacetic acid. Proton nuclear magnetic resonance analysis at 180 minutes indicated that 77% of the 2,6-xylenol had been consumed. After 265 minutes 91% of the 2,6-xylenol had been consumed. The resulting polymer as per GPC analysis had an Mw of 2100.

What is claimed is:

1. A method for making branched polyarylene ethers, said method comprising the step of melt polymerizing at least one first member selected from the group consisting of hydroxyaromatic monomers and oligomers prepared therefrom, in the presence of:
   (a) a catalyst composition comprising at least one second member selected from the group consisting of pyridine and substituted pyridine, in the amount of about 1–50 mole percent based on total moles of said hydroxyaromatic or structural units in said oligomer monomers; and
   (b) oxygen, wherein the method is conducted at a temperature of greater than about 100° C. to about 220° C.

2. A method for making branched polyarylene ethers in accordance with claim 1 wherein said first member consists of phenolic monomers represented by the formula

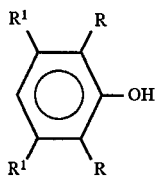

wherein each R is independently a halogen, $C_{1-10}$ alkyl group, aryl group, haloalkyl, aminoalkyl, hydrocarbonoxy or halohydrocarbonoxy having at least two carbon atoms separating the halogen and oxygen atoms and each $R^1$ is independently a hydrogen, halogen, $C_{1-10}$ alkyl group, aryl group, haloalkyl, hydrocarbonoxy or halohydrocarbonoxy as previously defined.

3. A method for making branched polyarylene ethers in accordance with claim 1 wherein said first member comprises oligomers having at least one hydroxy end group and 2,6-dimethylphenylene ether units.

4. A method for making branched polyarylene ethers in accordance with claim 1 wherein said catalyst composition further comprises a metal complex.

5. A method for making branched polyarylene ethers in accordance with claim 4 wherein said metal complex is a metal halide.

6. A method for making branched polyarylene ethers in accordance with claim 5 wherein said metal halide is copper chloride or copper bromide.

7. A method for making branched polyarylene ethers in accordance with claim 1 wherein said substituted pyridine comprises as substituents $C_{1-10}$ alkyl groups, $C_{1-10}$ alkoxy groups, aryl groups or halogens, with the proviso that the halogens are not in a para position.

8. A method for making branched polyarylene ethers in accordance with claim 1 wherein said catalyst composition is a structural isomer of $CuCl_2 \cdot (CH_3O)_2 \cdot (pyridine)_2$.

9. A method for making branched polyarylene ethers in accordance with claim 1 wherein said catalyst composition comprises metal to nitrogen bonds.

10. A method for making branched polyarylene ethers in accordance with claim 1 wherein said branched polyarylene ether has an intrinsic viscosity of greater than about 0.05 dL/g at ambient temperature.

11. A method for making branched polyarylene ethers, said method comprising the step of melt or solvent polymerizing at least one first member selected from the group consisting of 2,6-xylenol, 2,3,6-trimethylphenol and oligomers prepared therefrom, in the presence of:
   (a) a catalyst composition comprising at least one second member selected from the group consisting of pyridine and substituted pyridine; and
   (b) oxygen, wherein the method is conducted at a temperature of about 135° C. to about 220° C.

12. A method for making branched polyarylene ethers in accordance with claim 11 wherein said hydroxyaromatic monomers are phenolic monomers represented by the formula

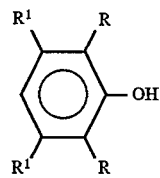

wherein each R is independently a halogen, $C_{1-10}$ alkyl group, aryl group, haloalkyl, aminoalkyl, hydrocarbonoxy or halohydrocarbonoxy having at least two carbon atoms separating the halogen and oxygen atoms and each $R^1$ is independently a hydrogen, halogen, $C_{1-10}$ alkyl group, aryl group, haloalkyl, hydrocarbonoxy or halohydrocarbonoxy as previously defined.

13. A method for making branched polyarylene ethers in accordance with claim 11 wherein said first member comprises oligomers having at least one hydroxy end group and 2,6-dimethylphenylene ether units.

14. A method for making branched polyarylene ethers in accordance with claim 11 wherein said catalyst composition further comprises a metal complex.

15. A method for making branched polyarylene ethers in accordance with claim 14 wherein said metal complex is a metal halide.

16. A method for making branched polyarylene ethers in accordance with claim 15 wherein said metal halide is copper chloride or copper bromide.

17. A method, for making branched polyarylene ethers in accordance with claim 11 wherein said substituted pyridine comprises as substituents $C_{1-10}$ alkyl groups, $C_{1-10}$ alkoxy groups, aryl groups or halogens, with the proviso that the halogens are not in a para position.

18. A method for making branched polyarylene ethers in accordance with claim 11 wherein said catalyst composition is a structural isomer of $CuCl_2 \cdot (CH_3O)_2 \cdot (pyridine)_2$.

19. A method for making branched polyarylene ethers in accordance with claim 11 wherein said catalyst composition comprises metal to nitrogen bonds.

20. A method for making branched polyarylene ethers in accordance with claim 11 wherein said branched polyarylene ether has an intrinsic viscosity of greater than about 0.05 dL/g at ambient temperature.

* * * * *